US012045825B2

(12) United States Patent
Sundararajan et al.

(10) Patent No.: US 12,045,825 B2
(45) Date of Patent: Jul. 23, 2024

(54) LINGUISTIC TRANSFORMATION BASED RELATIONSHIP DISCOVERY FOR TRANSACTION VALIDATION

(71) Applicant: International Business Machines Corporation, Armonk, NY (US)

(72) Inventors: Mukundan Sundararajan, Bangalore (IN); Anita Duggal, Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

(21) Appl. No.: 17/491,816

(22) Filed: Oct. 1, 2021

(65) Prior Publication Data
US 2023/0104607 A1    Apr. 6, 2023

(51) Int. Cl.
*G06Q 20/40* (2012.01)
*G06Q 20/36* (2012.01)

(52) U.S. Cl.
CPC ..... *G06Q 20/4016* (2013.01); *G06Q 20/3674* (2013.01); *G06Q 20/40145* (2013.01); *G06Q 20/407* (2013.01)

(58) Field of Classification Search
CPC .............. H04L 67/306; G06F 18/2323; G06F 40/268; G06F 16/3329; G06F 16/35
See application file for complete search history.

(56) References Cited

U.S. PATENT DOCUMENTS

| | | | | |
|---|---|---|---|---|
| 8,560,477 | B1* | 10/2013 | Petrov | G06F 18/2323 706/46 |
| 10,133,724 | B2* | 11/2018 | Bethard | G06F 16/35 |
| 2008/0243483 | A1* | 10/2008 | Schmid | G10L 15/28 704/E15.001 |

(Continued)

FOREIGN PATENT DOCUMENTS

| | | |
|---|---|---|
| CN | 107730262 A | 2/2018 |
| CN | 110209826 A | 9/2019 |

(Continued)

OTHER PUBLICATIONS

Wikipedia, Palantir Technologies, 2021, https://en.wikipedia.org/wiki/Palantir_Technologies.

(Continued)

*Primary Examiner* — Saba Dagnew
(74) *Attorney, Agent, or Firm* — Garg Law Firm, PLLC; Rakesh Garg; Michael O'Keefe (57) ABSTRACT

From transaction data, a graph modeling a set of relationships between transaction elements is constructed, a node of the graph representing a transaction element, an edge of the graph representing a relationship between two transaction elements. Using a part of speech analysis model, a subset of the nodes is tagged with a corresponding first part of speech tag. An alternative part of speech tag is generated for a tagged node. A set of tagged nodes is grouped into a word group including at least one tagged node having an alternative part of speech tag. The word group is validated against a grammar of a natural language. Responsive to the validating determining that the word group conforms to the grammar, a set of additional nodes representing the word group is added to the graph. Using the modified graph, a transaction in the transaction data is validated.

20 Claims, 8 Drawing Sheets

(56) References Cited

U.S. PATENT DOCUMENTS

| | | |
|---|---|---|
| 2010/0306032 A1 | 12/2010 | Jolley |
| 2018/0032876 A1 | 2/2018 | Altshuller et al. |
| 2018/0314704 A1* | 11/2018 | Bull .................... G06F 16/3329 |
| 2019/0363959 A1* | 11/2019 | Rice .................... G06Q 10/1095 |
| 2019/0386888 A1 | 12/2019 | Dewar et al. |
| 2020/0151399 A1 | 5/2020 | Lesner et al. |
| 2020/0226324 A1* | 7/2020 | Mattera .................. G06F 40/268 |
| 2021/0117978 A1 | 4/2021 | Silva et al. |

FOREIGN PATENT DOCUMENTS

| | | |
|---|---|---|
| CN | 110222194 A | 9/2019 |
| CN | 111832293 A | 10/2020 |
| KR | 101462040 B1 | 11/2014 |
| WO | 2018156781 A1 | 8/2018 |

OTHER PUBLICATIONS

Osorio, Introduction to SAP CRM Case Management Part II, Nov. 6, 2013, https://blogs.sap.com/2013/11/06/introduction-to-sap-crm-case-management-part-ii/.

IBM, Hybrid cloud and AI for Public Safety and Justice, 2021, https://www.ibm.com/industries/government/public-safety/crime-prediction-prevention.

Yadav et al., Sentence generation from a bag-of-words using N-gram model, 2014 IEEE International Conference on Advanced Communication Control and Computing Technologies (ICACCCT), 2014.

Directions Magazine, Palantir: An Open Source Development Success Story, DM Insights on Location, Feb. 13, 2013, https://www.directionsmag.com/article/1638.

International Searching Authority, PCT/CN2022/121613, Nov. 29, 2022.

* cited by examiner

LINGUISTIC TRANSFORMATION BASED RELATIONSHIP DISCOVERY FOR TRANSACTION VALIDATION

BACKGROUND

The present invention relates generally to a method, system, and computer program product for transaction validation. More particularly, the present invention relates to a method, system, and computer program product for linguistic transformation based relationship discovery for transaction validation.

Financial institutions and other entities that process financial transactions are often subject to legal or regulatory requirements to identify suspicious transactions. A suspicious transaction is one that is suspected of contravening an applicable law or regulation, such as those prohibiting money laundering or enforcing restrictions on trading with a particular entity or in a particular product. Validating a transaction refers to determining that a transaction is not suspicious.

A suspicious transaction is often identified by determining that a transaction, or series of transactions, has one or more suspicious indicators, such as payments received from an unrelated party without supporting business activities, an abrupt change in activity in an account, account activity that is inconsistent with typical business activity for a business associated with the account, a transactions that appears to have been conducted without a clear justification, over- or under-invoicing of goods or services, a common address or telephone number used by multiple unrelated receivers, and an account with multiple cash transactions in a single day. Thus, identifying correlations between transactions is often important in distinguishing whether a transaction is part of an established pattern or exhibits one or more suspicious indicators.

SUMMARY

The illustrative embodiments provide a method, system, and computer program product. An embodiment includes a method that constructs, from transaction data, a graph modeling a set of relationships between transaction elements, a node of the graph representing a transaction element, an edge of the graph representing a relationship between two transaction elements. An embodiment tags, using a part of speech analysis model, a subset of the nodes with a corresponding first part of speech tag. An embodiment generates, for a tagged node, an alternative part of speech tag, the alternative part of speech tag differing from the first part of speech tag of the tagged node. An embodiment groups, into a word group, a set of tagged nodes, the set of tagged nodes including at least one tagged node having an alternative part of speech tag. An embodiment validates, against a grammar of a natural language, the word group. An embodiment adds, to the graph, responsive to the validating determining that the word group conforms to the grammar, a set of additional nodes representing the word group, the set of additional nodes linked by a link representing a relationship expressed in the word group, the adding generating a modified graph. An embodiment validates, using the modified graph, a transaction in the transaction data.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that existing suspicious transaction identification systems typically rely on statistical or machine learning-based methods to determine entity and temporal correlations within data of a set of transactions processed by a particular processing system. The statistical methods are typically based on a multiple factor statistical analysis. The machine learning methods are typically based on recognizing a similarity of a transaction, or set of transactions, to a historical pattern. If a possibly suspicious transaction is identified, the transaction is flagged for a human analyst's review, further investigation if necessary, and final determination as to whether the transaction is suspicious or not. However, the statistical and machine learning methods presently available are not able to identify transactions with low or no correlation to existing transaction data processed by a particular processing system. For example, users might use different systems to process different transactions, or different types of transactions, even between the same entities, obscuring relationships between the entities. As well, entities may have relationships that are not readily apparent in transaction data, but could be determined by analyzing other types of data. Thus, the illustrative embodiments recognize that there is an unmet need to discover additional relationships, within both transactional and non-transactional data from multiple sources, when identifying correlations between transactions to distinguish a suspicious transaction from a valid one.

The illustrative embodiments recognize that the presently available tools or solutions do not address these needs or provide adequate solutions for these needs. The illustrative embodiments used to describe the invention generally address and solve the above-described problems and other problems related to linguistic transformation based relationship discovery for transaction validation.

An embodiment can be implemented as a software application. The application implementing an embodiment can be configured as a modification of an existing transaction validation system, as a separate application that operates in conjunction with an existing transaction validation system, a standalone application, or some combination thereof.

Particularly, some illustrative embodiments provide a method that constructs, from transaction data, a graph modeling a set of relationships between transaction elements, uses a part of speech analysis model to tag a subset of the nodes with a corresponding part of speech tag, generates an alternative part of speech tag for a tagged node, groups, into a word group, a set of tagged nodes including at least one tagged node having an alternative part of speech tag, validates the word group against a grammar, adds, to the graph, a set of nodes and links representing the validated word group, and validates, using the modified graph, a transaction in the transaction data.

An embodiment receives, as input, transaction data and optionally, data of one or more users that is not transaction data. Transaction data includes one or more transaction elements. Some non-limiting examples of transaction elements are a party to the transaction, a date of the transaction, and an amount of the transaction. For example, if A1 wire transferred $10,000 to A2 on April 1, A1, A2, $10,000, April 1, and the transaction method (wire transfer) might all be transaction elements of this transaction. User data includes data that is not associated with a particular transaction, but is data that might still be useful in determining a relationship between entities to help validate a transaction. User data includes one or more user data elements. Some non-limiting examples of user data elements are an entity's address and tax identification number, the corporate boards a human user serves on, where a human user went to school, and an entity's publicly available social media postings. For example, two people might have a relationship because they live next door to each other, both serve on the board of directors of the same corporation, went to the same school at the same time, or have interacted via social media. Note that a party to a transaction can be a human or a non-human entity such as a corporation or limited liability company (LLC).

An embodiment constructs a graph modeling a set of relationships between transaction elements from received transaction and user data. A graph is a mathematical abstraction including a set of objects, also called vertices, nodes, or points. An edge, or link, of the graph connects pairs of vertices that are related in some way modelled by the graph. In the embodiment, a node of the graph represents a transaction element, and an edge of the graph represents a relationship between a pair of nodes connected by the edge. For example, if A1 wire transferred $10,000 to A2 on April 1, A1, A2, $10,000, April 1, one example graph modelling the transaction might include nodes representing A1 and A2, with an edge connecting them. Another example graph modelling the transaction might include a node representing $10,000, with an edge connecting the $10,000 node to a node representing A1 and another node representing A2. Another example graph modelling the transaction might include additional nodes representing the transfer method, and the date. Another example graph modelling a set of transactions (including the transaction) and additional user data might also include additional nodes representing A1's school and A2's employer. To construct the graph, an embodiment uses a presently known information analysis and relationship graphing technique. For example, one presently known information analysis technique tests each attribute of data of a particular entity with each attribute of data of another entity, to attempt to determine a correlation between an attribute shared by the two entities. Some non-limiting examples of data attributes are an address, a name, a date, and a transaction amount. Although depicted herein as two-dimensional, a graph need not be two-dimensional, or have any particular number of dimensions.

One embodiment performs the information analysis and graph construction in response to a query from a system user. For example, a human analyst might have been alerted to a particular transaction above a threshold size (e.g. a $10,000 or higher transaction, which might trigger additional reporting requirements) and queried for addition data about parties to the alert-triggering transaction. Another embodiment does not perform the information analysis and graph construction in response to a specific query, but instead analyzes incoming data and updates the graph as a new relationship is determined or an existing relationship is determined to have changed by more than a threshold amount or percentage. One embodiment analyzes a stream of incoming data concurrently with data receipt. Another embodiment receives a batch of incoming data and analyzes the batch in a serial fashion. For example, an embodiment might be configured to receive a day's batch of transaction data daily at midnight, and process the batch overnight.

An embodiment uses a part of speech (POS) analysis model to tag a subset of the nodes of the graph with a corresponding part of speech tag. POS tagging identifies a part of speech corresponding to a word within a portion of natural language text, based on the word's definition and context. Some non-limiting examples of parts of speech are nouns, verbs, adjectives, and adverbs. For example, in the sentence, "A6 owns A5," "A6" and "A5" are nouns and "owns" is a verb. Presently available POS analysis models use a combination of rule-based and stochastic techniques to perform POS tagging.

One embodiment performs POS analysis on natural language documents input to the embodiment, then applies POS tags to nodes within the graph. For example, if the sentence "A6 owns A5" was part of natural language documents input to an embodiment, the embodiment might tag graph nodes corresponding to "A6" and "A5" as nouns and "owns" as a verb.

Another embodiment groups a set of connected graph nodes into a word group. A word group serves the same function as a grammatically correct natural language sentence, but need not be a grammatically correct sentence. Thus, one example of a word group is a sentence. Another example of a word group is a sentence triad, a combination of a noun, a verb, and an object. The embodiment validates a word group against a set of grammar rules of a human language, to determine whether the word group, in order, constitutes a grammatically correct sentence in that language. If the word group does constitute a grammatically correct sentence, the embodiment performs POS analysis on the sentence and tags graph nodes corresponding to the word group with results of the POS analysis. Techniques for forming a word group and validating a word group against a set of grammar rules of a language are presently known.

An embodiment generates, for a tagged node, one or more synonyms (e.g., "player" and "performer" are synonyms of "musician"). An embodiment also generates, for a tagged node, one or more additional word forms. Some non-limiting examples of additional word forms are different verb tenses (e.g., "plays", "playing", and "played"). One embodiment generates additional tagged nodes corresponding to generated synonyms and word forms, linked in the graph in the same manner as the original tagged node.

An embodiment generates, for a tagged node, an alternative part of speech tag. For example, if a node is tagged as a noun, an alternative part of speech tag might be a verb, or vice versa. As another example, if a node is tagged as a noun, an alternative part of speech tag might be an adjective or an adverb. An embodiment groups, into a word group, a set of tagged nodes including at least one tagged node having an alternative part of speech tag. An embodiment validates, against a grammar, the word group. Techniques for forming a word group and validating a word group against a set of grammar rules of a language are described elsewhere herein. An embodiment adds, to the graph, a set of nodes and links representing the validated word group, generating a modified graph in a manner described herein.

An embodiment forms the validated word group into a natural language sentence, and provides the sentence to a human transaction analyst as additional information for use in the analyst's transaction analysis.

Another embodiment validates, using the modified graph, a transaction in the transaction data. For example, forming a word group using a node tagged with alternative part of speech tag might expose an alternative relationship between entities, which can help determine whether a transaction is suspicious or not.

An embodiment uses a presently available natural language processing technique to form a natural language explanation of a transaction validation decision. In one embodiment, the natural language explanation includes a word group including at least one tagged node having an alternative part of speech tag, built out if necessary into a grammatically correct sentence. One embodiment uses a presently available natural language processing technique to classify a writing style of a human analyst, and uses the same writing style in forming a natural language explanation of a transaction validation decision.

The manner of linguistic transformation based relationship discovery for transaction validation described herein is unavailable in the presently available methods in the technological field of endeavor pertaining to automated transaction analysis. A method of an embodiment described herein, when implemented to execute on a device or data processing system, comprises substantial advancement of the functionality of that device or data processing system in constructing, from transaction data, a graph modeling a set of relationships between transaction elements, using a POS analysis model to tag a subset of the nodes with a corresponding part of speech tag, generating an alternative part of speech tag for a tagged node, grouping, into a word group, a set of tagged nodes including at least one tagged node having an alternative part of speech tag, validating the word group against a grammar, adding, to the graph, a set of nodes and links representing the validated word group, and validating, using the modified graph, a transaction in the transaction data.

The illustrative embodiments are described with respect to certain types of transaction data, user data, parts of speech, POS tags, POS analyses, word groups, grammars, entities, entity relationships, validations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
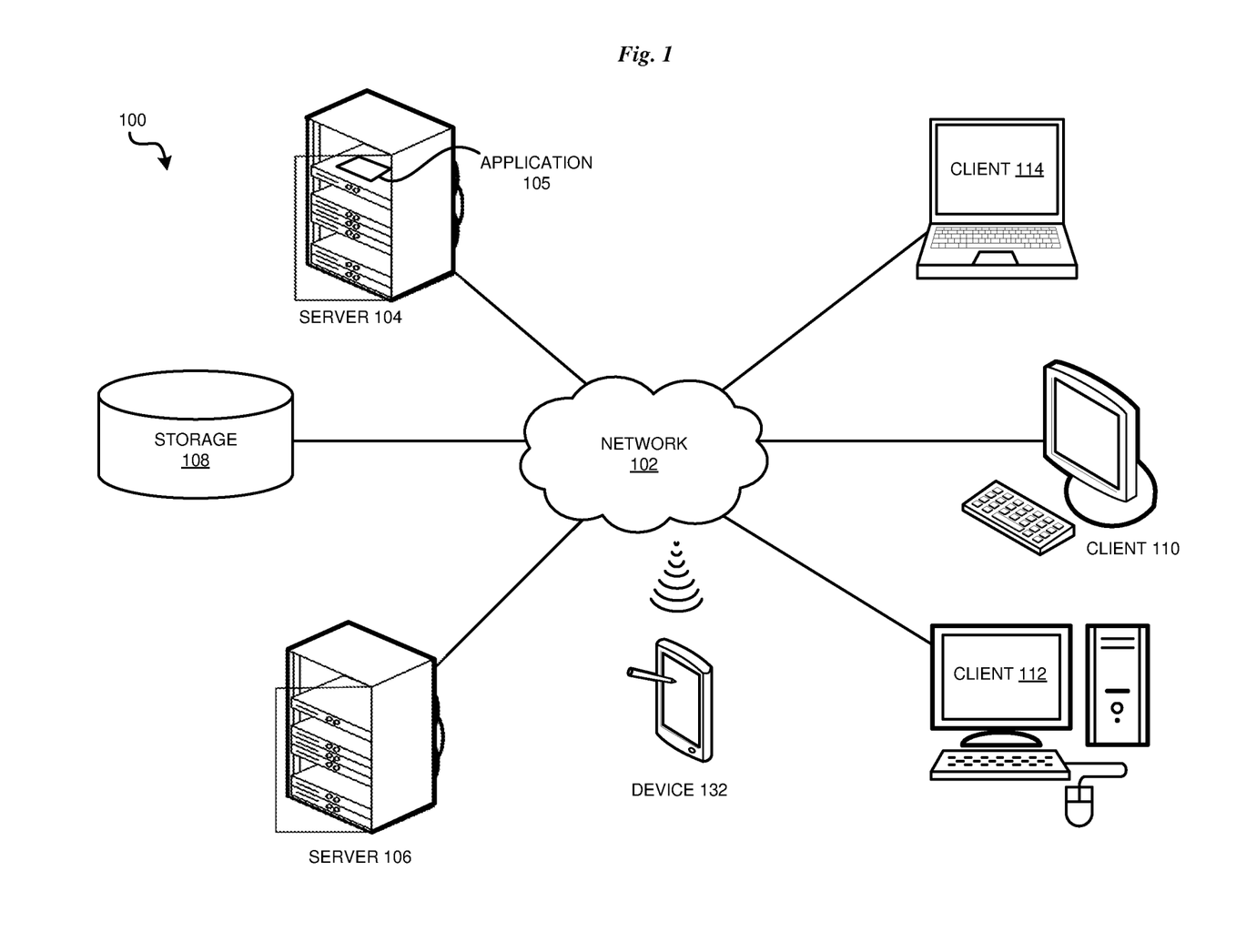
FIG. 1 depicts a block diagram of a network of data processing systems in which illustrative embodiments may be implemented.
Figure 2:
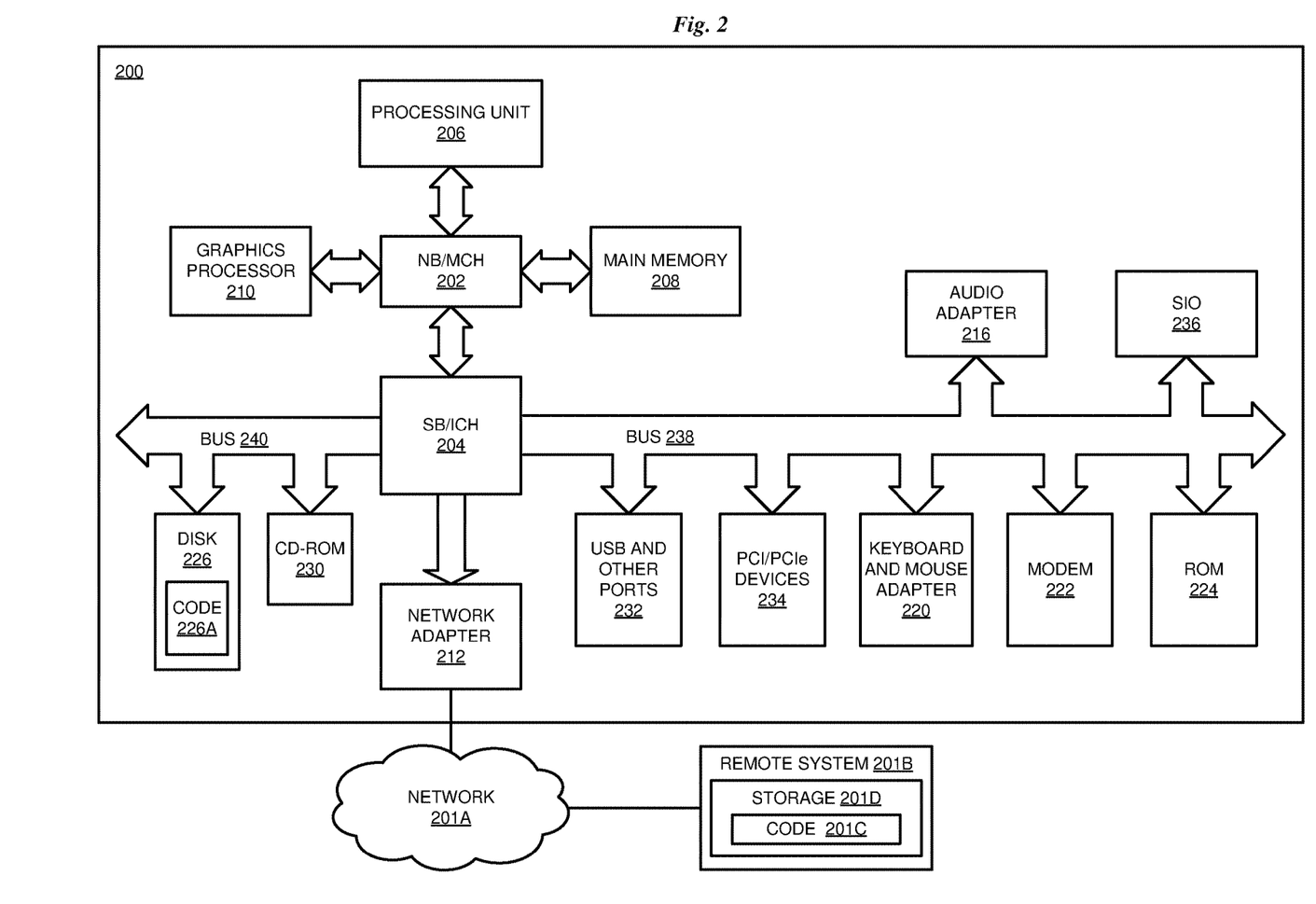
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
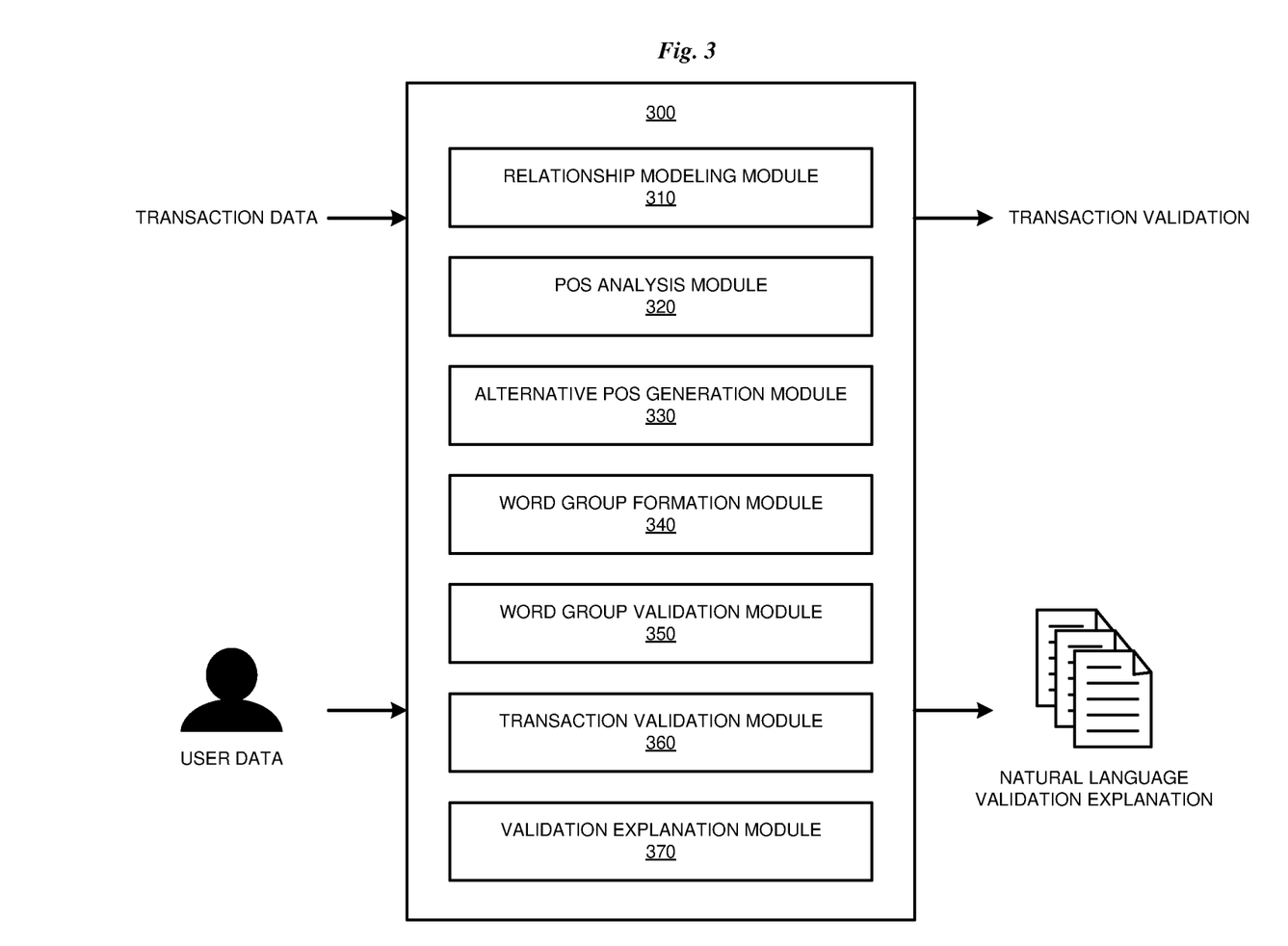
FIG. 3 depicts a block diagram of an example configuration for linguistic transformation based relationship discovery for transaction validation in accordance with an illustrative embodiment.

With reference to FIG. 3, this figure depicts a block diagram of an example configuration for linguistic transformation based relationship discovery for transaction validation in accordance with an illustrative embodiment. Application 300 is an example of application 105 in FIG. 1 and executes in any of servers 104 and 106, clients 110, 112, and 114, and device 132 in FIG. 1.

Application 300 receives, as input, transaction data and optionally, data of one or more users that is not transaction data. Relationship modeling module 310 constructs a graph modeling a set of relationships between transaction elements from received transaction and user data. In particular, a node of the graph represents a transaction element, and an edge of the graph represents a relationship between a pair of nodes connected by the edge. To construct the graph, module 310 uses a presently known information analysis and relationship graphing technique. One implementation of module 310 performs the information analysis and graph construction in response to a query from a system user. Another implementation of module 310 does not perform the information analysis and graph construction in response to a specific query, but instead analyzes incoming data and updates the graph as a new relationship is determined or an existing relationship is determined to have changed by more than a threshold amount or percentage. One implementation of module 310 analyzes a stream of incoming data concurrently with data receipt. Another implementation of module 310 receives a batch of incoming data and analyzes the batch in a serial fashion.

POS analysis module 320 uses a part of speech (POS) analysis model to tag a subset of the nodes of the graph with a corresponding part of speech tag. Presently available POS analysis models use a combination of rule-based and stochastic techniques to perform POS tagging. One implementation of module 320 performs POS analysis on natural language documents input to the embodiment, then applies POS tags to nodes within the graph.

In another implementation of application 300, word group formation module 340 groups a set of connected graph nodes into a word group. A word group serves the same function as a grammatically correct natural language sentence, but need not be a grammatically correct sentence. Word group validation module 340 validates a word group against a set of grammar rules of a human language, to determine whether the word group, in order, constitutes a grammatically correct sentence in that language. If the word group does constitute a grammatically correct sentence, module 320 performs POS analysis on the sentence and tags graph nodes corresponding to the word group with results of the POS analysis. Techniques for forming a word group and validating a word group against a set of grammar rules of a language are presently known.

Alternative POS generation module 330 generates, for a tagged node, an alternative part of speech tag. Module 340 groups, into a word group, a set of tagged nodes including at least one tagged node having an alternative part of speech tag. Module 350 validates, against a grammar, the word group. Module 310 adds, to the graph, a set of nodes and links representing the validated word group, generating a modified graph.

One implementation of application 300 forms the validated word group into a natural language sentence, and provides the sentence to a human transaction analyst as additional information for use in the analyst's transaction analysis.

In another implementation of application 300, transaction validation module 360 validates, using the modified graph, a transaction in the transaction data. Validation explanation module 370 uses a presently available natural language processing technique to form a natural language explanation of a transaction validation decision. In one implementation of module 370, the natural language explanation includes a word group including at least one tagged node having an alternative part of speech tag, built out if necessary into a grammatically correct sentence.

Figure 4:
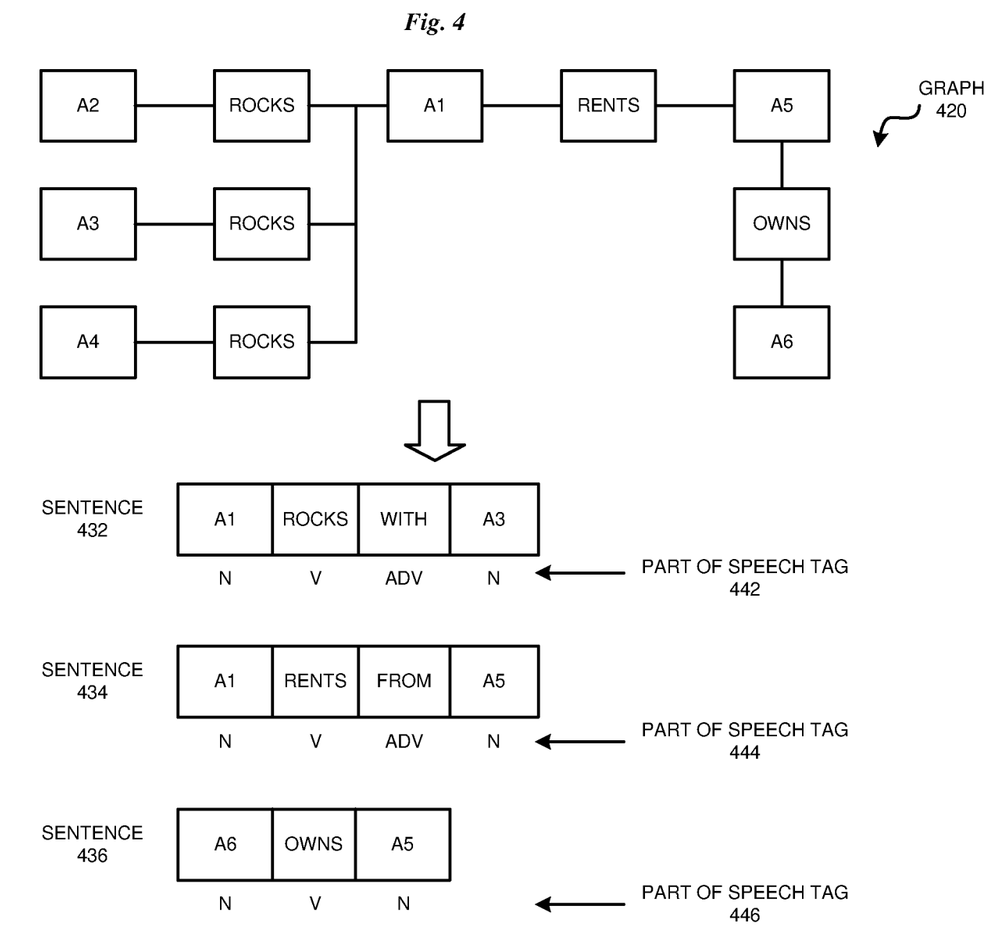
FIG. 4 depicts an example of linguistic transformation based relationship discovery for transaction validation in accordance with an illustrative embodiment.

With reference to FIG. 4, this figure depicts an example of linguistic transformation based relationship discovery for transaction validation in accordance with an illustrative embodiment. The example can be executed using application 300 in FIG. 3.

Graph 420 depicts a graph that application 300 constructed from user and transaction data of entities A1, A2, A3, A4, A5, and A6. In particular, as is evident from their social media messages and publicity announcements A1, A2, A3, and A4 play in the same rock band. As is evident from their history of monetary transactions, A1 distributes varying amounts of money, never more than $100 each (the proceeds of each player's share of ticket sales, tips, and merchandise sales) to A2, A3, and A4, around 2 am on most Sunday mornings. Thus graph 420 includes nodes corresponding to A1, A2, A3, and A4, and nodes denoting the relationship ("rocks") each of A2, A3, and A4 has with A1. As well, as is evident from A1's payment history, A1 pays $1000 every first of the month to A5, with a notation that each transaction is for "rent". Thus graph 420 includes a node corresponding to A5 and an additional node, "rents", denoting the relationship between A1 and A5. As is evident from additional user data, A5 is an LLC, and A6 is the sole owner of A5. Thus graph 420 also includes a node corresponding to A6 and an additional node, "owns", denoting the relationship between A5 and A6.

Application 300 has used a POS analysis model to tag a subset of the nodes of the graph with a corresponding part of speech tag. Thus, sentence 432 has been tagged with corresponding part of speech tags 442, sentence 434 has been tagged with corresponding part of speech tags 444, and sentence 436 has been tagged with corresponding part of speech tags 446.

Figure 5:
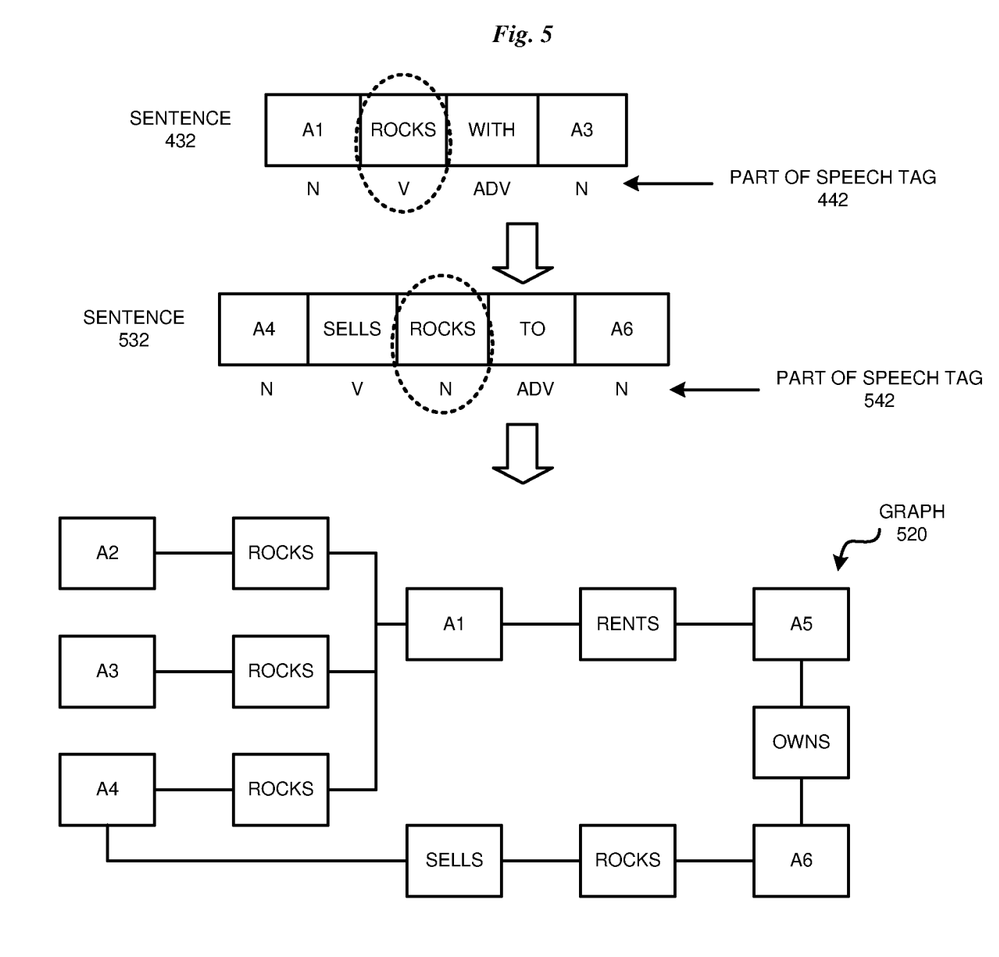
FIG. 5 depicts a continued example of linguistic transformation based relationship discovery for transaction validation in accordance with an illustrative embodiment.

With reference to FIG. 5, this figure depicts a continued example of linguistic transformation based relationship discovery for transaction validation in accordance with an illustrative embodiment. Sentence 432 and part of speech tags 442 are the same as sentence 432 and part of speech tags 442 in FIG. 4.

As depicted, application 300 has generated an alternative part of speech tag for "rocks" in sentence 432, changing the node's tag from a verb to a noun. Application 300 has also grouped, into a word group, a set of tagged nodes including at least one tagged node having an alternative part of speech tag and validated, against a grammar, the word group. The results are depicted in sentence 532, with part of speech tags 542, including "rocks" used as a noun instead of a verb. Thus, graph 520 has been modified from graph 420 in FIG. 4 to include nodes and links corresponding to the relationships expressed in sentence 532. Now graph 520 represents an additional relationship—A4 sells rocks to A6 (A4, needing additional cash since the rock band does not pay enough, has sold a valuable rock collection to A6). This additional relationship could be used to validate a one-time transaction between A4 and A6.

Figure 6:
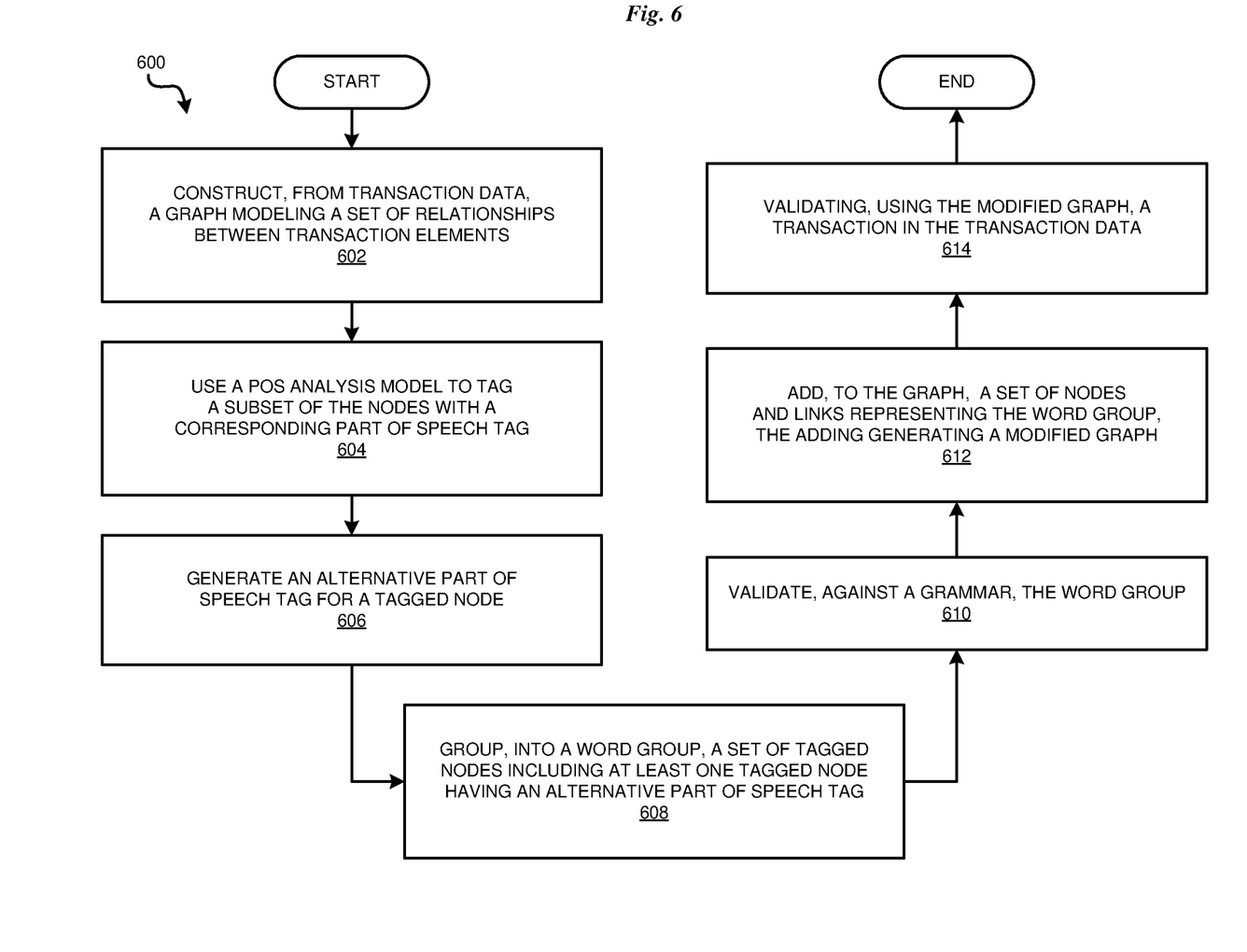
FIG. 6 depicts a flowchart of an example process for linguistic transformation based relationship discovery for transaction validation in accordance with an illustrative embodiment.

With reference to FIG. 6, this figure depicts a flowchart of an example process for linguistic transformation based relationship discovery for transaction validation in accordance with an illustrative embodiment. Process 600 can be implemented in application 300 in FIG. 3.

In block 602, the application constructs, from transaction data, a graph modeling a set of relationships between transaction elements. In block 604, the application uses a POS analysis model to tag a subset of the nodes with a corresponding part of speech tag. In block 606, the application generates an alternative part of speech tag for a tagged node. In block 608, the application groups, into a word group, a set of tagged nodes including at least one tagged node having an alternative part of speech tag. In block 610, the application validates, against a grammar, the word group. In block 612, the application adds, to the graph, a set of nodes and links representing the word group, the adding generating a modified graph. In block 614, the application validates, using the modified graph, a transaction in the transaction data. Then the application ends.

Figure 7:
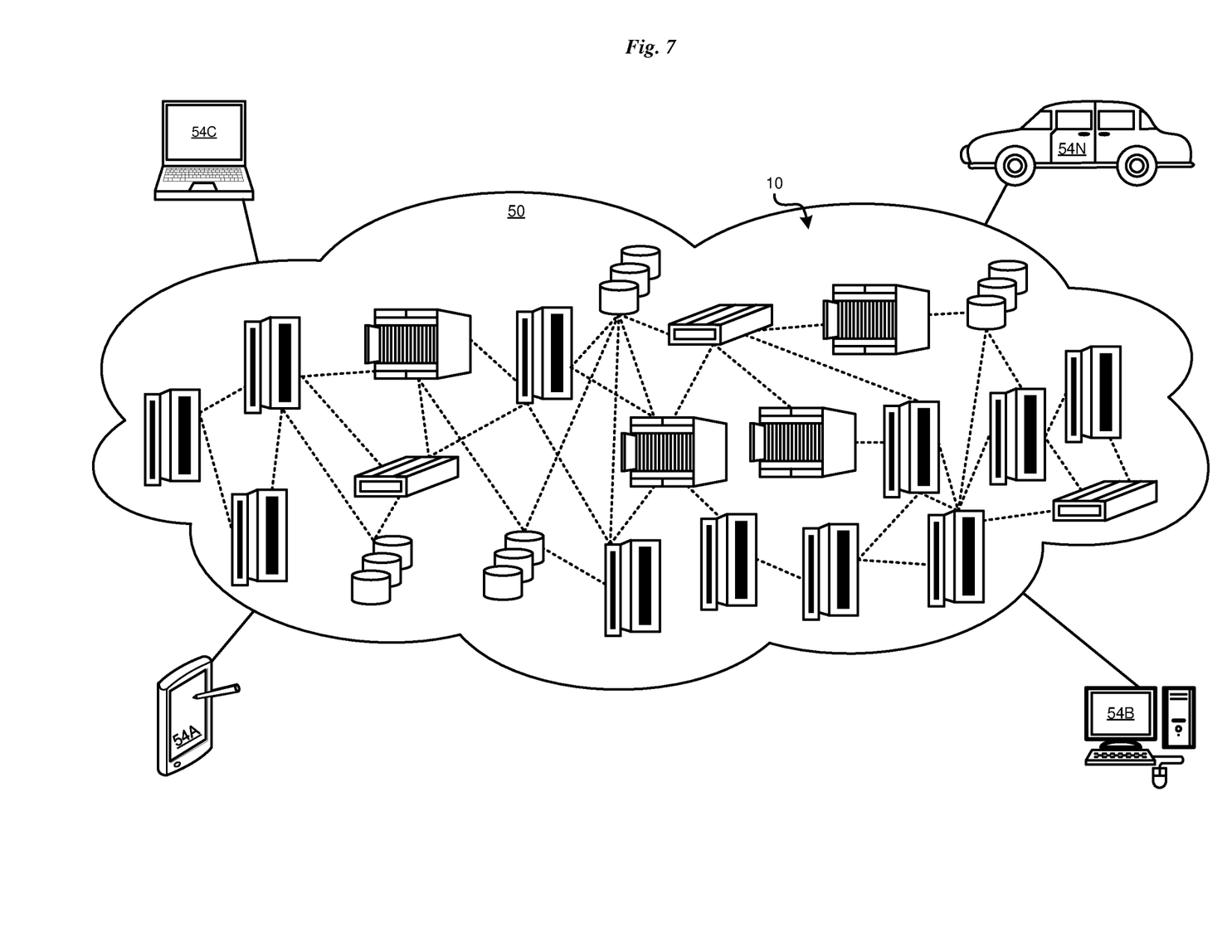
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
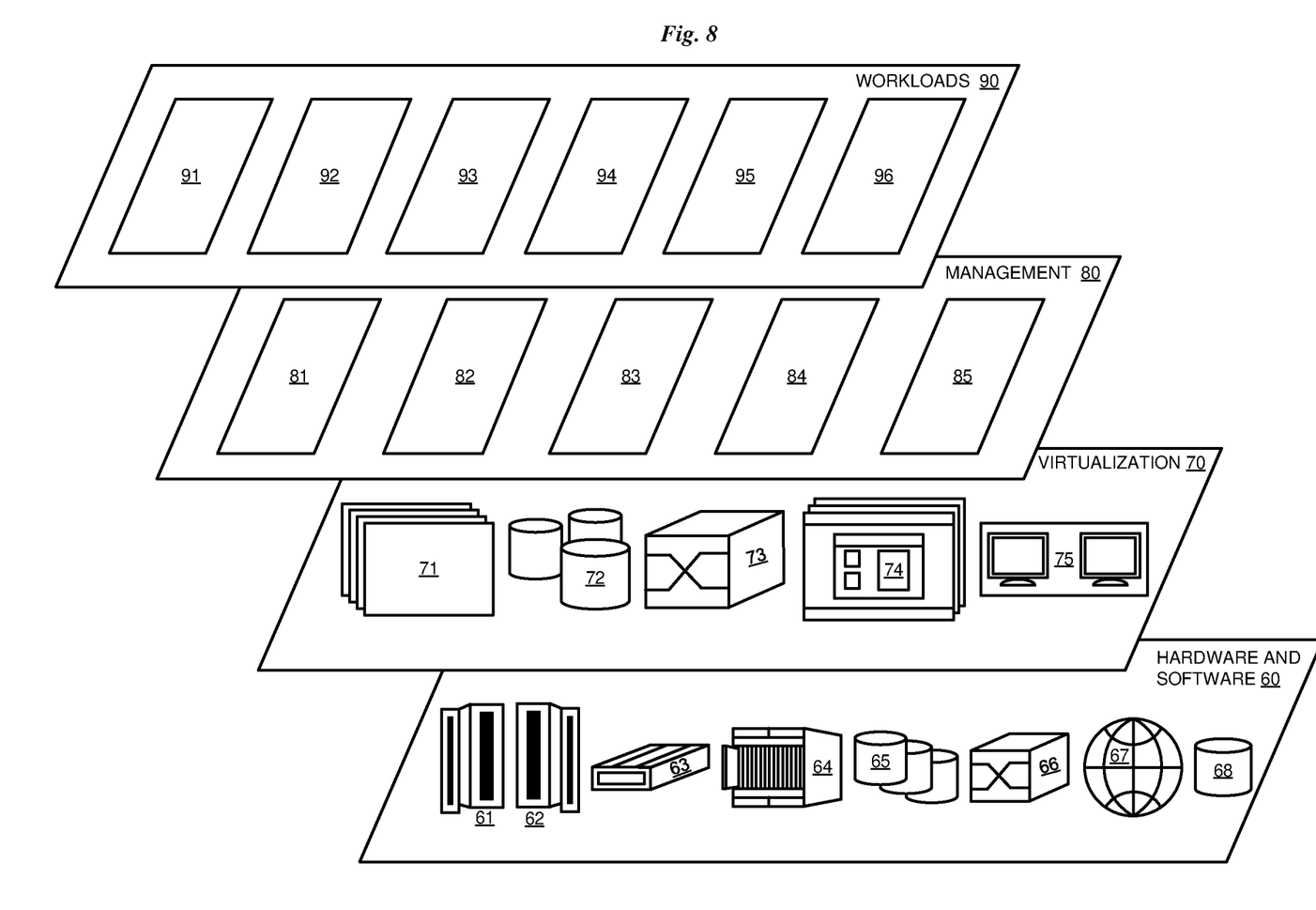
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for linguistic transformation based relationship discovery for transaction validation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   determining a correlation between an attribute shared by two entities represented in a stream of transaction data, the determining performed concurrently with receipt of the stream of transaction data;
   constructing, from the stream of transaction data, a graph modeling a set of relationships between transaction elements in the stream of transaction data, a node of the graph representing a transaction element, an edge of the graph representing a relationship between two transaction elements, a relationship between two transaction elements comprising the correlation;
   tagging a subset of the nodes with a corresponding first part of speech tag, the tagging performed by analyzing, using a part of speech analysis model, a natural language document comprising an entity represented by a node;
   generating, for a tagged node, using the part of speech analysis model, an alternative part of speech tag, wherein the alternative part of speech tag denotes usage of the tagged node as a different part of speech from the first part of speech tag of the tagged node;
   forming, into a sentence, a set of tagged nodes, the set of tagged nodes including at least one tagged node having an alternative part of speech tag;
   validating, against a grammar of a natural language, the sentence;
   adding, to the graph, responsive to the validating determining that the sentence conforms to the grammar, a set of additional nodes representing the sentence, wherein an added link to a node in the set of additional nodes represents a relationship expressed in the sentence, the adding generating a modified graph; and
   validating a first transaction, the validating performed by determining, using the modified graph, that the added link connects a first node representing a first party to a first transaction in the transaction data with a second node representing a second party to the first transaction.

2. The computer-implemented method of claim 1, further comprising:
   adding, to the graph, a set of user data nodes, a user data node in the set of user data nodes representing a user data element, a link between the user data node and another node of the graph representing a relationship between the user data element and another data element.

3. The computer-implemented method of claim 1, wherein the graph is constructed in response to a query regarding the transaction.

4. The computer-implemented method of claim 1, wherein the first part of speech tag comprises a verb tag and the alternative part of speech tag comprises a noun tag.

5. The computer-implemented method of claim 1, wherein the first part of speech tag comprises a noun tag and the alternative part of speech tag comprises a verb tag.

6. The computer-implemented method of claim 1, further comprising:
   generating, using the modified graph, a natural language text sentence.

7. A computer program product for relationship discovery for transaction validation, the computer program product comprising:
   one or more computer readable storage media, and program instructions collectively stored on the one or more computer readable storage media, the stored program instructions comprising:
   program instructions to determine a correlation between an attribute shared by two entities represented in a stream of transaction data, the determining performed concurrently with receipt of the stream of transaction data;
   program instructions to construct, from the stream of transaction data, a graph modeling a set of relationships between transaction elements in the stream of transaction data, a node of the graph representing a transaction element, an edge of the graph representing a relationship between two transaction elements, a relationship between two transaction elements comprising the correlation;
   program instructions to tag a subset of the nodes with a corresponding first part of speech tag, the tagging performed by analyzing, using a part of speech analysis model, a natural language document comprising an entity represented by a node;
   program instructions to generate, for a tagged node, using the part of speech analysis model, an alternative part of speech tag, wherein the alternative part of speech tag denotes usage of the tagged node as a different part of speech from the first part of speech tag of the tagged node;
   program instructions to form, into a sentence, a set of tagged nodes, the set of tagged nodes including at least one tagged node having an alternative part of speech tag;
   program instructions to validate, against a grammar of a natural language, the sentence;
   program instructions to add, to the graph, responsive to the validating determining that the sentence conforms to the grammar, a set of additional nodes representing the sentence, wherein an added link to a node in the set of additional nodes represents a relationship expressed in the sentence, the adding generating a modified graph; and
   program instructions to validate a first transaction, the validating performed by determining, using the modified graph, that the added link connects a first node representing a first party to a first transaction in the transaction data with a second node representing a second party to the first transaction, using the modified graph, a transaction in the transaction data.

8. The computer program product of claim 7, the stored program instructions further comprising:
    program instructions to add, to the graph, a set of user data nodes, a user data node in the set of user data nodes representing a user data element, a link between the user data node and another node of the graph representing a relationship between the user data element and another data element.

9. The computer program product of claim 7, wherein the graph is constructed in response to a query regarding the transaction.

10. The computer program product of claim 7, wherein the first part of speech tag comprises a verb tag and the alternative part of speech tag comprises a noun tag.

11. The computer program product of claim 7, wherein the first part of speech tag comprises a noun tag and the alternative part of speech tag comprises a verb tag.

12. The computer program product of claim 7, the stored program instructions further comprising:
    program instructions to generate, using the modified graph, a natural language text sentence.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
    program instructions to determine a correlation between an attribute shared by two entities represented in a stream of transaction data, the determining performed concurrently with receipt of the stream of transaction data;
    program instructions to construct, from the stream of transaction data, a graph modeling a set of relationships between transaction elements in the stream of transaction data, a node of the graph representing a transaction element, an edge of the graph representing a relationship between two transaction elements, a relationship between two transaction elements comprising the correlation;
    program instructions to tag a subset of the nodes with a corresponding first part of speech tag, the tagging performed by analyzing, using a part of speech analysis model, a natural language document comprising an entity represented by a node;
    program instructions to generate, for a tagged node, using the part of speech analysis model, an alternative part of speech tag, wherein the alternative part of speech tag denotes usage of the tagged node as a different part of speech from the first part of speech tag of the tagged node;
    program instructions to form, into a sentence, a set of tagged nodes, the set of tagged nodes including at least one tagged node having an alternative part of speech tag;
    program instructions to validate, against a grammar of a natural language, the sentence;
    program instructions to add, to the graph, responsive to the validating determining that the sentence conforms to the grammar, a set of additional nodes representing the sentence, wherein an added link to a node in the set of additional nodes represents a relationship expressed in the sentence, the adding generating a modified graph; and
    program instructions to validate a first transaction, the validating performed by determining, using the modified graph, that the added link connects a first node representing a first party to a first transaction in the transaction data with a second node representing a second party to the first transaction, using the modified graph, a transaction in the transaction data.

17. The computer system of claim 16, the stored program instructions further comprising:
    program instructions to add, to the graph, a set of user data nodes, a user data node in the set of user data nodes representing a user data element, a link between the user data node and another node of the graph representing a relationship between the user data element and another data element.

18. The computer system of claim 16, wherein the graph is constructed in response to a query regarding the transaction.

19. The computer system of claim 16, wherein the first part of speech tag comprises a verb tag and the alternative part of speech tag comprises a noun tag.

20. The computer system of claim 16, wherein the first part of speech tag comprises a noun tag and the alternative part of speech tag comprises a verb tag.

* * * * *